United States Patent [19]

Levy

[11] 4,402,779
[45] Sep. 6, 1983

[54] METHOD FOR AT LEAST PARTLY METALIZING THE SURFACE OF A LAMINATED COMPONENT

[75] Inventor: Fernand J. Levy, La Defense, France

[73] Assignee: Avions Marcel Dassault-Breguet Aviation, Vaucresson, France

[21] Appl. No.: 284,224

[22] Filed: Jul. 17, 1981

[30] Foreign Application Priority Data

Jul. 17, 1980 [FR] France .............................. 80 15816

[51] Int. Cl.³ ........................ B29C 13/00; B05D 5/12; B32B 31/12; B32B 27/00
[52] U.S. Cl. .................................... 156/245; 156/279; 156/307.3; 156/278; 427/203; 427/205; 427/422; 264/131; 264/136; 264/258; 244/133
[58] Field of Search .................... 156/279, 307.3, 245, 156/278, 264, 151; 427/191, 203, 205, 422; 264/131, 136, 258; 244/119, 125, 126, 133

[56] References Cited

U.S. PATENT DOCUMENTS

| | | | |
|---|---|---|---|
| 2,188,721 | 1/1940 | McWhorter et al. | 427/422 |
| 2,439,137 | 4/1948 | Keller | 156/151 |
| 2,748,019 | 5/1956 | Schramm | 427/195 |
| 3,160,550 | 12/1964 | Novak et al. | 156/151 |
| 3,674,585 | 7/1972 | Windecker | 156/245 |

FOREIGN PATENT DOCUMENTS

| | | | |
|---|---|---|---|
| 749143 | 6/1970 | Belgium | 156/151 |
| 2218797 | 9/1974 | France | 427/203 |
| 9042504 | 4/1974 | Japan | 427/203 |
| 50-99930 | 8/1975 | Japan | 156/279 |
| 54-141829 | 11/1979 | Japan | 156/279 |
| 55-1111 | 1/1980 | Japan | 427/203 |

*Primary Examiner*—Edward C. Kimlin
*Assistant Examiner*—F. K. Wine
*Attorney, Agent, or Firm*—Watson, Cole, Grindle & Watson

[57] ABSTRACT

In a method for at least partly metalizing the surface of a laminated component, the layer of material which is to form part of the surface of the component is first metalized; then it is coated, as are the other layers of non-metalized material, with a polymerizable resin; and lastly the coated layers are stacked on the lower part of a mould, which is then subjected to pressure, possibly under heat.

2 Claims, 2 Drawing Figures

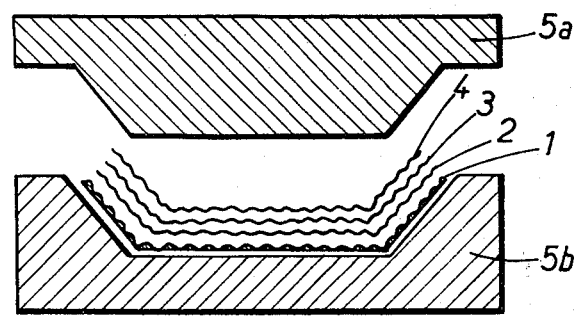
FIG.:1
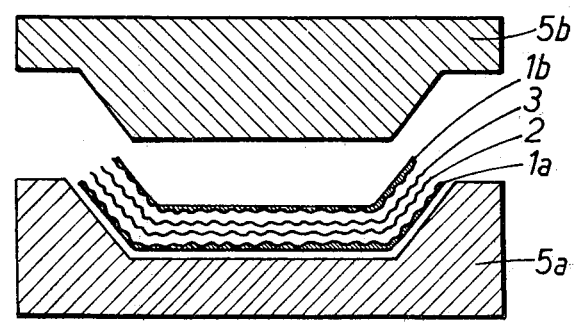
FIG.:2

METHOD FOR AT LEAST PARTLY METALIZING THE SURFACE OF A LAMINATED COMPONENT

BACKGROUND OF THE INVENTION

This invention relates to a method for at least partly metalizing the exterior and/or interior surface of a laminated component of a kind which is obtained by moulding a stack of layers of a material not containing any metallic fibres, in particular a material of synthetic fibres, these layers being coated with a polymerizable resin.

Laminated components of this type obtained by moulding are particularly useful in aeronautical contruction, for example, in the production of casings, in streamlining aircraft, etc. Many of these laminated components must have at least partial metalization on their surface, the purpose of this metalization being to ensure protection against charges of static electricity, electromagnetic interference, lightning and/or erosion, as the case may be.

It is already known that metalization of a component of this type can be achieved by incorporating a wire lattice between two layers of material before the component is moulded. However, a component produced in this way has poor mechanical strength due to the poor adhesion of the lattice to the layers of material; furthermore, the lattice provides only limited protection against electromagnetic interference and poor protection against electro-static charges.

The metalization of the surface of a laminated component can also be achieved, as is known, after the moulding of the component has been completed, by a process such as the electrolytic deposition of metal, or the projection onto the surface of the component of particles of molten metal, or even a metalizing paint, that is, a paint containing a high proportion of metallic powder. However, the metalization of laminated components after they have been moulded presents numerous disadvantages: the components have to be transferred from the moulding shop to a metalizing shop; prior to their metallization the surface of each component has to undergo a thorough and therefore costly treatment; the total manufacturing time, and hence the cost, of each laminated component is increased considerably; and finally the metallic film or the layer of metalizing paint has only a weak adhesion, often insufficient, to the component, which renders the metalization sensitive to impact, scratches, etc. Such a type of metalization therefore often has to be renewed during the working life of the component.

The method according to this invention makes it possible to avoid the numerous disadvantages of the methods previously known for the metalization of laminated components.

SUMMARY OF THE INVENTION

According to the invention there is provided a method for at least partly metalizing the exterior and/or interior surface of a laminated component formed by moulding a stack of layers of synthetic fibre material not containing metallic fibres, these layers being coated with a polymerizable resin, the method comprising at least partly metalizing the layer or layers of material which are to form the exterior and/or interior surface of the component before the component is moulded.

The method according to the present invention therefore avoids the necessity of transferring the already moulded laminated components into a metalizing shop and of giving their surfaces a thorough and costly treatment beforehand. It therefore permits a reduction in the total manufacturing time of each laminated metalized component, and thus a reduction in its cost. Finally, the polymerizable resin which coats the layer of material which has been previously metalized penetrates so well between the fibres of material during the moulding operation that, in each finished component, the particles forming the metalization are agglomerated with each other and with the fibres of material by the hardened coating of resin, and this is achieved without any alteration in the electrical continuity of the metalization. Because of this, the metalization of a laminated component obtained by the method according to the present invention presents a very high resistance to impact, scratches and other mechanical effects, which resistance is so good that the layer of metalization can have a working life equal to that of the component itself.

In a preferred form of the method according to the invention, the metalization of the layer of material is carried out by the projection of particles of molten metal, for example, by means of a jet of compressed air, produced by a special gun.

BRIEF DESCRIPTION OF THE DRAWINGS

FIG. 1 shows diagrammatically a stage of manufacturing a laminated component by moulding, where only the convex part of its surface is metalized, and FIG. 2 shows the same stage of manufacture of a laminated component by moulding, where the concave part as well as the convex part of the surface is metalized.

DETAILED DESCRIPTION OF THE PREFERRED EMBODIMENTS

Firstly, the manufacture is to be described, by a method according to the invention, of a laminated component in the form of a channel or gutter, where only the convex part of its surface is to be metalized. This laminated component will comprise, in known manner, a stack of a certain number of layers of a material not containing metallic fibres; possibly a material of natural fibres, but preferably a material of synthetic fibres, particularly glass, carbon or Kevlar (trade name) fibres. Even before cutting out the layer of material which is to form the part of the surface of the component to be metalized, the material may be metalized while it is still rolled up, for example by projecting onto one of the surfaces of the material particles of molten metal, particularly by means of a powerful jet of compressed air. For this purpose a gun can be used of the "metalizing gun" type, various types of such gun being available in the trade.

Due to their high kinetic energy, the metal particles penetrate between the fibres of material and deposit on them so well that, owing to their liquid state, they form a regular and electrically-conducting metallic layer on the corresponding surface of material, this layer adhering perfectly to the surface fibres of the material. The use of a metalizing gun makes it possible to adjust precisely the thickness of the metallic layer deposited, which could, for example, be some tenths of a millimeter or even only some hundredths of a millimeter. Then a piece with its shape and dimensions adapted to those of the component to be manufactured is cut from the roll of metalized material. Pieces with appropriate shapes and dimensions are then cut from the rolls of non-metalized material, the number chosen depending on the relationship between the thickness of the material and the thickness which the wall of the finished component is to have. Next, the layer of metalized material and the layers of non-metalized material are coated with a polymerizable resin which can be a polyester, an epoxy resin, a phenol-formaldehyde resin, a polyimide resin, etc. The pieces of material which have been coated are then stacked in the die 5b of an appropriate mould, as shown in FIG. 1. First the layer of metalized material 1 is positioned so that its previously metalized surface is directly in contact with the die 5b of the mould, and the other layers of non-metalized material 2, 3, 4 are then stacked on top. Then the moulding of the component is carried out, in known manner, by bringing together the punch 5a and the die 5b of the mould, for example, by means of a press. If the metalization is to be on the concave part of the surface of the component to be produced, then the layer of metalized material should be placed on top of the stack, that is in place of the layer 4 in FIG. 1, while a layer of non-metalized material will be in direct contact with the die 5b.

FIG. 2 shows the same stage of the manufacturing process, but in the case where the convex part as well as the concave part of the surface of a component has to be metalized. In this case, a layer of metalized material 1a is first placed in direct contact with the die 5a and then, after having positioned the layers of non-metalized material 2 and 3, a second layer of metalized material 1b is placed on top of the stack.

After polymerizing the resin coating the various layers of material, which can be accelerated by heating, the laminated component is removed and then, if necessary, it is trimmed at its ends.

As previously described, by positioning the layer or layers of metalized material in such a way that they form at least part of the surface of the component, one avoids having to insert a metallic layer between two layers of coated material, which would harm the cohesion of the laminated component.

Of course, the method according to the present invention can be used to obtain on the surface of a laminated component not only a continuous metalization, but, for example, a network of metallic strips or a metallic layer of any form. For this purpose, it is adequate, during the metalization of the layer or layers of material, to protect the parts of the layer which are not to be metalized with templates.

This invention is not limited to the embodiments described above. It encompasses all their variations. Most metals, such as aluminium and its alloys, zinc, silver, etc., can be used in the process of metalization according to the invention. Of course, the layer or layers of material can be metalized within the limits of the method according to the present invention by using any other known metalization process, such as the electrolytic deposition of metal, or the projection of metalizing paint.

What is claimed is:

1. A method for manufacturing a laminated component comprising the successive steps of:
    (a) at least partly metalizing only one surface of a component consisting essentially of metal-free fibrous material by projecting thereon particles of molten metal so that said particles strongly adhere to the surface fibres of said fibrous material and form a regular, electrically-conducting surface layer,
    (b) cutting at least one flat piece in said metalized fibrous material,
    (c) cutting a plurality of flat pieces in another component consisting essentially of metal-free fibrous material;
    (d) coating the metalized and non-metalized components with a polymerizable resin;
    (e) superposing in a moulding die said metalized and non-metalized coated components so as to form a stack having an exposable top surface and an exposable bottom surface, at least one of said top and bottom exposable surfaces of said stack consisting of the metalized surface of a metalized component and the remainder of said stack consisting essentially of said components of metal-free fibrous material; and
    (f) moulding the stack of flat pieces formed in said die by the action of pressure-generating means so that said stack is polymerized.

2. A method according to claim 1, wherein two flat pieces are cut in said metalized fibrous material, then the stack of superposed coated flat pieces is formed in the moulding die with the exposable top and bottom surfaces of said stack consisting of the respective metalized surfaces of said two metalized flat pieces.

* * * * *